United States Patent
Zhong et al.

(10) Patent No.: US 11,036,535 B2
(45) Date of Patent: Jun. 15, 2021

(54) DATA STORAGE METHOD AND APPARATUS

(71) Applicant: Huawei Technologies Co., Ltd., Shenzhen (CN)

(72) Inventors: Yong Zhong, Shenzhen (CN); Ming Lin, Shenzhen (CN); Ruilin Peng, Shenzhen (CN); Jun Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 16/188,951

(22) Filed: Nov. 13, 2018

(65) Prior Publication Data

US 2019/0079791 A1    Mar. 14, 2019

Related U.S. Application Data

(63) Continuation of application No. PCT/CN2017/087212, filed on Jun. 5, 2017.

(30) Foreign Application Priority Data

Nov. 21, 2016 (CN) .......................... 201611043007.7

(51) Int. Cl.
  *G06F 9/46*    (2006.01)
  *G06F 9/455*   (2018.01)
  *G06F 3/06*    (2006.01)
  *G06F 11/20*   (2006.01)

(52) U.S. Cl.
  CPC ........ *G06F 9/45558* (2013.01); *G06F 3/0604* (2013.01); *G06F 3/065* (2013.01); *G06F 3/067* (2013.01); *G06F 3/0614* (2013.01); *G06F 3/0664* (2013.01); *G06F 11/2094* (2013.01);
  (Continued)

(58) Field of Classification Search
  CPC .. G06F 9/45558; G06F 3/0604; G06F 3/0614; G06F 3/065; G06F 3/0664; G06F 3/067; G06F 11/2094
  See application file for complete search history.

(56) References Cited

U.S. PATENT DOCUMENTS

| 2012/0079315 A1 | 3/2012 | Isherwood et al. |
| 2012/0102258 A1* | 4/2012 | Hepkin ............... G06F 9/45558 711/6 |
| 2013/0185667 A1 | 7/2013 | Harper et al. |

(Continued)

FOREIGN PATENT DOCUMENTS

| CN | 104142853 A | 11/2014 |
| CN | 104335182 A | 2/2015 |

(Continued)

*Primary Examiner* — Camquy Truong
(74) *Attorney, Agent, or Firm* — Slater Matsil, LLP (57) ABSTRACT

A data storage method and a physical server are provided. M virtual machines are deployed on a plurality of physical servers. The M virtual machines are respectively deployed as M data nodes in a distributed storage system. A metadata node in the distributed storage system receives a data storage request of a client, and determines identifiers of N virtual machines from the M virtual machines based on stored grouping information. The grouping information records a mapping relationship between a plurality of anti-affinity groups and identifiers of the M virtual machines.

19 Claims, 6 Drawing Sheets

(52) U.S. Cl.
   CPC ............ *G06F 2009/45562* (2013.01); *G06F 2009/45583* (2013.01)

(56)       References Cited

U.S. PATENT DOCUMENTS

| | | | |
|---|---|---|---|
| 2013/0326053 | A1 | 12/2013 | Bauer et al. |
| 2014/0164694 | A1 | 6/2014 | Storer |
| 2016/0205518 | A1* | 7/2016 | Patel .................. H04L 67/1002 455/518 |
| 2016/0359668 | A1* | 12/2016 | Udupi ................. G06F 9/45533 |
| 2017/0005869 | A1* | 1/2017 | Prasad .................. H04Q 11/00 |
| 2018/0239633 | A1 | 8/2018 | Li et al. |

FOREIGN PATENT DOCUMENTS

| | | | |
|---|---|---|---|
| CN | 104484220 | A | 4/2015 |
| CN | 104657087 | A | 5/2015 |
| CN | 105656646 | A | 6/2016 |
| CN | 106020937 | A | 10/2016 |
| CN | 106648462 | A | 5/2017 |
| EP | 3040860 | A1 | 7/2016 |

* cited by examiner

DATA STORAGE METHOD AND APPARATUS

CROSS-REFERENCE TO RELATED APPLICATIONS

This application is a continuation of International Application No. PCT/CN2017/087212, filed on Jun. 5, 2017, which claims priority to Chinese Patent Application No. 201611043007.7, filed on Nov. 21, 2016. The disclosures of the aforementioned applications are hereby incorporated by reference in their entireties.

TECHNICAL FIELD

The present application relates to the field of data storage technologies, and in particular, to a data storage method and apparatus.

BACKGROUND

Development of electronic information technologies results in a substantial increase of a data volume on a network. To store and manage a large amount of data, various data storage technologies emerge. A distributed storage system is widely applied because of its advantages of security and convenience.

The distributed storage system generally includes a client, a metadata node (MDS), and a plurality of data nodes (SNs). The distributed storage system may be usually deployed in a virtualization environment. The virtualization environment is set up on a plurality of physical servers using a virtualization technology, and a virtual machine manager deploys several virtual machines on the plurality of physical servers. The virtual machine manager may be different in different virtualization technologies. For example, the virtual machine manager may be an Hypervisor Manager (HM), a Kernel-based Virtual Machine (KVM), or a Virtual Machine Manager (VMM). Each of the client, the MDS, and the SNs in the distributed storage system may be deployed in any one of the several virtual machines. The MDS may query, using the virtual machine manager, a physical address of each physical server and an identifier of a virtual machine deployed on each physical server, and store the physical address of each physical server and the identifier of the virtual machine deployed on each physical server.

When the distributed storage system deployed in the virtualization environment is used to store to-be-stored target data, the client sends a data storage request to the MDS. The MDS returns the identifier of the virtual machine to the client based on the physical address of each physical server and the identifier of the virtual machine deployed on each physical server that are pre-stored. When receiving the returned identifier of the virtual machine, the client stores the target data to an SN that is deployed in the corresponding virtual machine.

The distributed storage system deployed in the virtualization environment is usually a third-party system, and when performing data storage by using the foregoing method, the distributed storage system needs to depend on the physical address of each physical server and the identifier of the virtual machine deployed on each physical server. In this case, a position of each physical server and a virtual machine distribution status of each physical server may be leaked, to bring a security risk to the physical server. Consequently, this reduces stability and security of the physical server, and also reduces stability and security of the virtualization environment and the distributed storage system deployed in the virtualization environment.

SUMMARY

To resolve a problem in a current system, embodiments of the present application provide a data storage method and apparatus. The technical solutions are as follows.

According to a first aspect, a data storage method is provided, where at least M virtual machines are deployed on a plurality of physical servers, the M virtual machines are respectively deployed as M SNs in a distributed storage system, M is a positive integer greater than or equal to 2. The method includes receiving, by an MDS in the distributed storage system, a data storage request of a client. The method also includes determining, by the MDS, that a quantity of storage copies of data specified in the data storage request is N, where N is a positive integer greater than or equal to 1. The method also includes determining, by the MDS, identifiers of N virtual machines based on grouping information, where the N virtual machines corresponding to the identifiers of the N virtual machines belong to at least one anti-affinity group, a mapping relationship between a plurality of anti-affinity groups and identifiers of the M virtual machines is recorded in the grouping information, virtual machines in each anti-affinity group have anti-affinity with each other, and the M virtual machines include the N virtual machines. The method also includes sending, by the MDS, response information of the data storage request to the client, where the response information includes the identifiers of the N virtual machines, and the response information instructs the client to store, in the N virtual machines, N copies of the data specified in the data storage request.

In this embodiment of the present application, the MDS in the distributed storage system can receive the data storage request of the client, and determine, from the at least one anti-affinity group based on the stored grouping information, the identifiers of the N virtual machines that meet a data storage requirement, to ensure that the client can store data in the virtual machines that correspond to the identifiers of the N virtual machines and that are deployed as SNs. The mapping relationship between the plurality of anti-affinity groups and the identifiers of the M virtual machines is recorded in the grouping information, with no need to obtain physical addresses of the plurality of physical servers or a virtual machine distribution status of each physical server. Therefore, a position of each physical server and the virtual machine distribution status of each physical server are not disclosed. This improves stability and security of the physical server, and further improves stability and security of a virtualization environment and the distributed storage system deployed in the virtualization environment.

Further, the determining, by the MDS, identifiers of N virtual machines based on grouping information includes: if a quantity of identifiers of the virtual machines included in the anti-affinity group is greater than or equal to N, determining, by the MDS, the identifiers of the N virtual machines from one of the plurality of anti-affinity groups; or if a quantity of identifiers of the virtual machines included in the anti-affinity group is less than N, determining, by the MDS, the identifiers of the N virtual machines from at least two anti-affinity groups.

For example, the anti-affinity group includes X virtual machines, and if X is less than N, the MDS may determine X virtual machines from any one of the at least two anti-affinity groups, and determine N-X virtual machines from another of the at least two anti-affinity groups, to obtain the N virtual machines.

In this embodiment of the present application, when determining the identifiers of the N virtual machines, the MDS can compare N with the quantity of virtual machines included in the anti-affinity group, and determine the identifiers of the N virtual machines using a different policy depending on a comparison result. This ensures reliability and stability of the storage system, and also improves flexibility of the distributed storage system.

Further, the determining, by the MDS, the identifiers of the N virtual machines from at least two anti-affinity groups includes: determining, by the MDS, the identifiers of the N virtual machines from the at least two anti-affinity groups based on affinity.

The MDS may determine the X virtual machines from any one of the at least two anti-affinity groups, and determine, from another of the at least two anti-affinity groups based on affinity, the N-X virtual machines that are in a same affinity group as at least one of the X virtual machines, to obtain the N virtual machines.

In this embodiment of the present application, it can be ensured that when the quantity of virtual machines included in the anti-affinity group is less than N, the MDS can still determine the identifiers of the N virtual machines. This improves reliability of the distributed storage.

Optionally, before the determining, by the MDS, identifiers of N virtual machines based on grouping information, the method further includes: receiving, by the MDS, the identifiers of the M virtual machines sent by a virtual machine manager; grouping, by the MDS, the M virtual machines into the plurality of anti-affinity groups, and recording, in the grouping information, the mapping relationship between the plurality of anti-affinity groups and the identifiers of the M virtual machines; and sending, by the MDS, the grouping information to the virtual machine manager, so that the virtual machine manager deploys the M virtual machines based on the grouping information.

In this embodiment of the present application, the MDS can group the identifiers of the N virtual machines that are sent by the virtual machine manager, and send the grouping information to the virtual machine manager, to ensure that the virtual machine manager can deploy the N virtual machines based on the grouping information. This ensures that an actual distribution status of the N virtual machines on the plurality of physical servers is consistent with the grouping information, and further improves stability and reliability of the distributed storage system.

Optionally, the M virtual machines belong to a plurality of affinity groups, virtual machines in each affinity group have affinity with each other, and a mapping relationship between the plurality of affinity groups and the identifiers of the M virtual machines is recorded in the grouping information.

In this embodiment of the present application, the M virtual machines may further belong to the plurality of affinity groups. To be specific, several virtual machines in the M virtual machines not only can be grouped into an anti-affinity group based on anti-affinity, but also can be grouped into an affinity group based on affinity, to meet different storage requirements. This improves flexibility of the distributed storage system.

According to a second aspect, a data storage method is provided, where at least M virtual machines are deployed on a plurality of physical servers, the M virtual machines are respectively deployed as M SNs in a distributed storage system, M is a positive integer greater than or equal to 2. The method includes receiving, by an MDS in the distributed storage system, identifiers of the M virtual machines sent by a virtual machine manager. The method also includes grouping, by the MDS, the M virtual machines into a plurality of anti-affinity groups, where virtual machines in each anti-affinity group have anti-affinity with each other. The method also includes recording, by the MDS in grouping information, a mapping relationship between the plurality of anti-affinity groups and the identifiers of the M virtual machines, where the grouping information is used by the MDS to determine identifiers of N virtual machines from at least one anti-affinity group when a client requests to store data, the N virtual machines are configured to store N copies of client-specified to-be-stored data, and N is a positive integer greater than or equal to 1. The method also includes sending, by the MDS, the grouping information to the virtual machine manager, so that the virtual machine manager deploys the M virtual machines based on the grouping information.

In this embodiment of the present application, the MDS can first group the identifiers of the N virtual machines that are sent by the virtual machine manager, and send the grouping information to the virtual machine manager, to ensure that the virtual machine manager can deploy the N virtual machines based on the grouping information. This ensures that an actual distribution status of the N virtual machines on the plurality of physical servers is consistent with the grouping information, and improves stability and reliability of the distributed storage system. In addition, because physical addresses of the plurality of physical servers or a virtual machine distribution status of each physical server does not need to be obtained, a position of each physical server and the virtual machine distribution status of each physical server are not disclosed. This improves stability and security of the physical server, and further improves stability and security of a virtualization environment and the distributed storage system deployed in the virtualization environment.

According to a third aspect, a data storage method is provided, where at least M virtual machines are deployed on a plurality of physical servers, the M virtual machines are respectively deployed as M SNs in a distributed storage system, M is a positive integer greater than or equal to 2. The method includes sending, by a virtual machine manager, identifiers of the M virtual machines to an MDS in the distributed storage system. The method also includes receiving, by the virtual machine manager, grouping information sent by the MDS, where a mapping relationship between a plurality of anti-affinity groups and the identifiers of the M virtual machines is recorded in the grouping information, virtual machines in each anti-affinity group have anti-affinity with each other, the grouping information is used by the MDS to determine identifiers of N virtual machines from at least one anti-affinity group when a client requests to store data, the N virtual machines are configured to store N copies of client-specified to-be-stored data, and N is a positive integer greater than or equal to 1. The method also includes deploying, by the virtual machine manager, the M virtual machines based on the grouping information.

In this embodiment of the present application, the virtual machine manager may send, to the MDS, the identifiers of the M virtual machines that are deployed as SNs, and deploy the M virtual machines based on the received grouping information that is obtained by grouping the M virtual machines. This ensures that an actual distribution status of the N virtual machines on the plurality of physical servers is consistent with the grouping information, and improves stability and reliability of the distributed storage system. In addition, because physical addresses of the plurality of physical servers or a virtual machine distribution status of each physical server does not need to be sent to the MDS, a position of each physical server and the virtual machine distribution status of each physical server are not disclosed. This improves stability and security of the physical server, and further improves stability and security of a virtualization environment and the distributed storage system deployed in the virtualization environment.

Further, the M virtual machines belong to a plurality of affinity groups, virtual machines in each affinity group have affinity with each other, and a mapping relationship between the plurality of affinity groups and the identifiers of the M virtual machines is recorded in the grouping information.

In this embodiment of the present application, the virtual machine manager can deploy the M virtual machines based on the grouping information, and the M deployed M virtual machines may further belong to the plurality of affinity groups. To be specific, several virtual machines in the M virtual machines not only can be grouped into an anti-affinity group based on anti-affinity, but also can be grouped into an affinity group based on affinity, to meet different storage requirements. This improves flexibility of the distributed storage system.

According to a fourth aspect, a data storage apparatus is provided, where the data storage apparatus has functions for implementing the data storage method in the first aspect. The data storage apparatus includes at least one module, and the at least one module is configured to implement the data storage method provided in the first aspect.

According to a fifth aspect, a data storage apparatus is provided, where the data storage apparatus has functions for implementing the data storage method in the second aspect. The data storage apparatus includes at least one module, and the at least one module is configured to implement the data storage method provided in the second aspect.

According to a sixth aspect, a data storage apparatus is provided, where the data storage apparatus has functions for implementing the data storage method in the third aspect. The data storage apparatus includes at least one module, and the at least one module is configured to implement the data storage method provided in the third aspect.

According to a seventh aspect, a data storage apparatus is provided, where a structure of the data storage apparatus includes a processor and a memory. The memory is configured to store a program that supports the data storage apparatus to execute the data storage method provided in the first aspect, and/or store data involved in implementing the data storage method provided in the first aspect. The processor is configured to execute the program stored in the memory. An operation apparatus of the storage device may further include a communications bus. The communications bus is configured to establish a connection between the processor and the memory.

According to an eighth aspect, a data storage apparatus is provided, where a structure of the data storage apparatus includes a processor and a memory. The memory is configured to store a program that supports the data storage apparatus to execute the data storage method provided in the second aspect, and/or store data involved in implementing the data storage method provided in the second aspect. The processor is configured to execute the program stored in the memory. An operation apparatus of the storage device may further include a communications bus. The communications bus is configured to establish a connection between the processor and the memory.

According to a ninth aspect, a data storage apparatus is provided, where a structure of the data storage apparatus includes a processor and a memory. The memory is configured to store a program that supports the data storage apparatus to execute the data storage method provided in the third aspect, and/or store data involved in implementing the data storage method provided in the third aspect. The processor is configured to execute the program stored in the memory. An operation apparatus of the storage device may further include a communications bus. The communications bus is configured to establish a connection between the processor and the memory.

According to a tenth aspect, an embodiment of the present application provides a computer storage medium, configured to store a computer software instruction used by the data storage apparatus provided in any one of the fourth aspect to the ninth aspect, or store a program designed for executing the data storage method in any one of the first aspect to the third aspect.

The technical solutions provided in the embodiments of the present application have the following beneficial effects. In the embodiments of the present application, the MDS in the distributed storage system can receive the data storage request of the client, and determine, from the at least one anti-affinity group based on the stored grouping information, the identifiers of the N virtual machines that meet a data storage requirement, to ensure that the client can store data in the virtual machines that correspond to the identifiers of the N virtual machines and that are deployed as SNs. The mapping relationship between the plurality of anti-affinity groups and the identifiers of the M virtual machines is recorded in the grouping information, with no need to obtain physical addresses of the plurality of physical servers or a virtual machine distribution status of each physical server. Therefore, a position of each physical server and the virtual machine distribution status of each physical server are not disclosed. This improves stability and security of the physical server, and further improves stability and security of a virtualization environment and the distributed storage system deployed in the virtualization environment.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may derive other drawings from these accompanying drawings.

DETAILED DESCRIPTION OF ILLUSTRATIVE EMBODIMENTS

To make the objectives, technical solutions, and advantages of the present application clearer, the following further describes the embodiments of the present application in detail with reference to the accompanying drawings.

Figure 1:
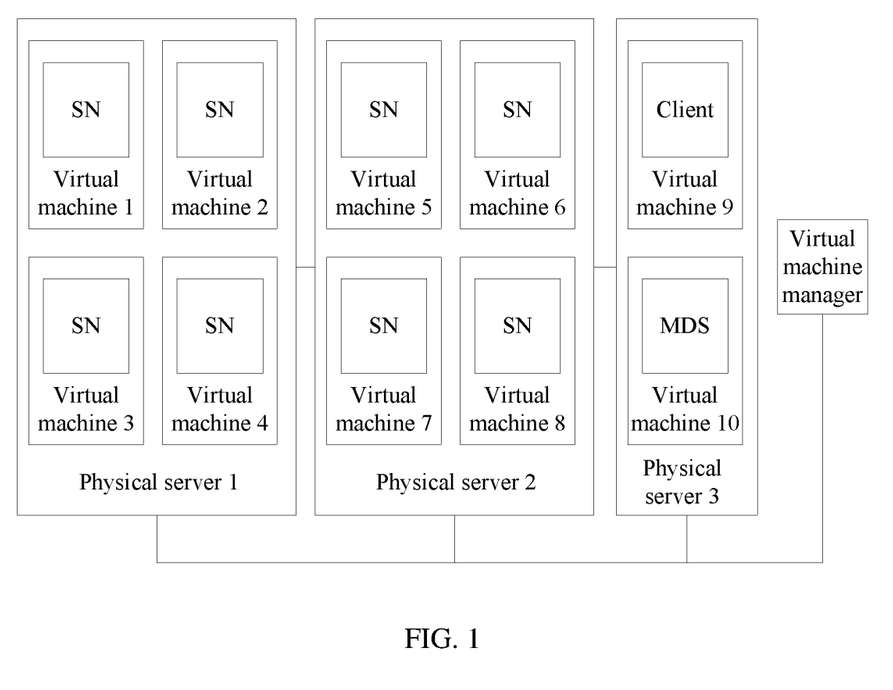
FIG. 1 is an architectural diagram of a distributed storage system in a virtualization environment according to an embodiment of the present application.

FIG. 1 is an architectural diagram of a distributed storage system in a virtualization environment according to an embodiment used as an example. Referring to FIG. 1, the distributed storage system includes software control ends such as a client, an MDS, and a plurality of SNs (only eight SNs are shown in FIG. 1). In addition, the virtualization environment is set up on a plurality of physical servers using a virtualization technology, and a virtual machine manager deploys several virtual machines on the plurality of physical servers. Any two of the plurality of physical servers may be connected through a network.

In this embodiment of the present application, some or all SNs in the distributed storage system may be deployed in any one of the several virtual machines.

Optionally, each of the client, the MDS, and the SNs in the distributed storage system may be deployed in any one of the several virtual machines.

Optionally, each of the client and the MDS in the distributed storage system may be deployed on a physical server. Some SNs in the distributed storage system are deployed in several virtual machines, and the remaining SNs may be deployed on physical servers.

In this embodiment of the present application, the client may communicate with the MDS, to send a data storage request to the MDS, and receive an identifier of a virtual machine that is allocated by the MDS and that is deployed as an SN; or the client may communicate with some of the plurality of SNs, to store data in or read data from some of the plurality of SNs.

The MDS may communicate with the virtual machine manager. The MDS may query, by using the virtual machine manager, an identifier of a virtual machine that is on one of the plurality of physical servers and that is deployed as an SN. The MDS may receive an identifier that is of a virtual machine deployed as an SN and that is sent by the virtual machine manager.

The identifier of the virtual machine is used to uniquely identify the virtual machine on one of the plurality of physical servers, and the identifier of the virtual machine may be an Internet Protocol (IP) address, a port number, a name, or the like of the virtual machine. Certainly, in an actual realization, the identifier of the virtual machine may alternatively be another identifier that can uniquely identify the virtual machine on each of the plurality of physical servers.

It should be further noted that, in actual use, the virtual machine manager may be deployed on a physical device other than the plurality of physical servers, for example, another physical server different from the plurality of physical servers. Certainly, the virtual machine manager may alternatively be deployed on a specific physical server of the plurality of physical servers depending on an actual requirement.

Figure 2:
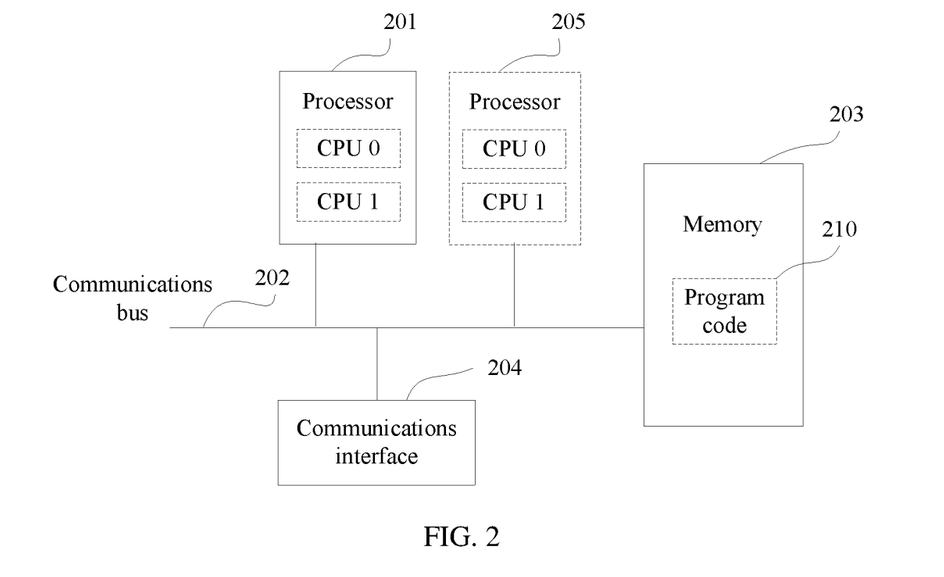
FIG. 2 is a schematic structural diagram of a physical server according to an embodiment of the present application.

FIG. 2 is a schematic structural diagram of a physical server according to an embodiment of the present application. The physical server may be any physical server in FIG. 1. Referring to FIG. 2, the physical server includes at least one processor 201, a communications bus 202, a memory 203, and at least one communications interface 204.

The processor 201 may be a central processing unit (CPU), a microprocessor, an application-specific integrated circuit (ASIC), or one or more integrated circuits that can execute a program for implementing the embodiments of the present application.

The communications bus 202 may include a path, and transmit data between components (such as the processor 201, the memory 203, and the communications interface 204) included in the physical server.

The memory 203 may be a read-only memory (ROM), a random access memory (RAM), another type of static storage device that can store static data and a static instruction, or another type of dynamic storage device that can store data and an instruction; or may be an electrically erasable programmable read-only memory (EEPROM), a compact disc read-only memory (CD-ROM), or another compact disc storage medium, optical disc storage medium (including a compact disc, a laser disc, an optical disc, a digital versatile disc, a Blu-ray disc, and the like), a magnetic disk storage medium, or another magnetic storage device, or any other medium that can be configured to carry or store desired program code in the form of an instruction or a data structure and that can be accessed by the physical server, but is not limited thereto. The memory 203 may exist independently, or may be connected to the processor 201 by using the communications bus 202, or may be integrated with the processor 201.

The communications interface 204 may be any transceiver-like apparatus for communication with another device through a communication network. The communication network may be an Ethernet, a radio access network (RAN), a wireless local area network (WLAN), or the like. The another device may be a device (such as a movable computer device or a portable mobile terminal) on which a client or an SN is deployed.

In specific implementation, in an embodiment, the processor 201 may include one or more CPUs, such as a CPU 0 and a CPU 1 shown in FIG. 2.

In specific implementation, in an embodiment, the physical server may include a plurality of processors, such as the processor 201 and a processor 205 shown in FIG. 2. Each of the processors may be a single-core processor (single-CPU), or a multi-core processor (multi-CPU). The processor herein may be one or more devices, circuits, and/or processor cores for processing data.

The memory 203 is configured to store program code 210 for implementing the embodiments of the present application, and the processor 201 is configured to execute the program code 210 stored in the memory 203. The physical server may execute the program code 210 in the memory 203 by using the processor 201, to implement a data storage method provided in the following embodiment of FIG. 3A.

Figure 3A:
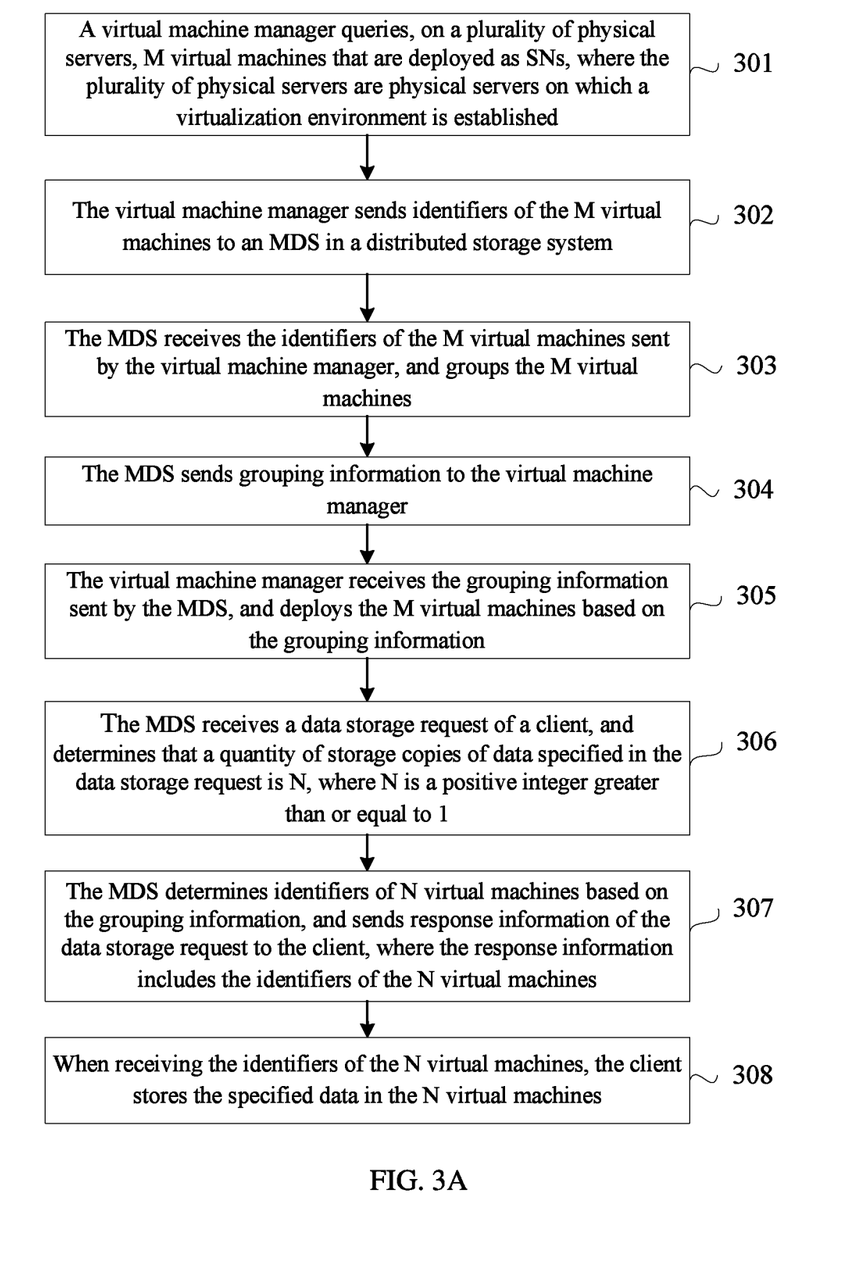
FIG. 3A is a flowchart of a data storage method according to an embodiment of the present application.

FIG. 3A is a flowchart of a data storage method according to an embodiment of the present application. At least M virtual machines are deployed on a plurality of physical servers, the M virtual machines are respectively deployed as M SNs in a distributed storage system, and M is a positive integer greater than or equal to 2. Referring to FIG. 3A, the method includes the following steps.

Step 301: A virtual machine manager queries, on the plurality of physical servers, the M virtual machines that are deployed as SNs, where the plurality of physical servers are physical servers on which a virtualization environment is established.

The M SNs (may be all or some SNs in the distributed storage system) are deployed in the virtual machines of the plurality of physical servers, and running statuses of the virtual machines are directly related to stability and reliability of the distributed storage system. Therefore, in order to manage the virtual machines deployed on the plurality of physical servers and ensure stability and reliability of the distributed storage system, the virtual machine manager may query, on the plurality of physical servers, the M virtual machines that are deployed as SNs.

It should be noted that the virtual machine manager may perform an operation in step 301 after receiving a virtual machine query request sent by an MDS.

It should be further noted that, when deploying a virtual machine on each physical server, the virtual machine manager may obtain and store an identifier of the currently deployed virtual machine. Certainly, in an actual realization, the virtual machine manager may alternatively obtain, in another manner, identifiers of the M virtual machines that are deployed as SNs. For example, in a possible implementation, the virtual machine manager sends a virtual machine identifier obtaining request to each of the plurality of physical servers. When receiving the virtual machine identifier obtaining request, the physical server sends, to the virtual machine manager, an identifier of a virtual machine that is in the physical server and that is deployed as an SN.

For example, the distributed storage system is deployed on three physical servers, and the virtual machine manager determines that identifiers of virtual machines that are on the three physical servers and that are deployed as SNs are respectively VM1, VM2, VM3, VM4, VM5, VM6, VM7, VM8, VM9, VM10, VM11, and VM12.

Step 302: The virtual machine manager sends identifiers of the M virtual machines to an MDS in the distributed storage system.

Because the identifiers of the virtual machines found by the virtual machine manager are identifiers of virtual machines that are deployed as SNs, to ensure that data can be stored in the SNs in the distributed storage system, the virtual machine manager may send the found identifiers of the virtual machines to the MDS.

It should be noted that the MDS may send the virtual machine query request to the virtual machine manager, so that the virtual machine manager queries, on the plurality of physical servers, the identifiers of the M virtual machines that are deployed as SNs, and sends the found identifiers of the virtual machines to the MDS in steps 301 and 302, to ensure that the MDS can query, on the plurality of physical servers, the M virtual machines that are deployed as SNs. Certainly, in an actual realization, the MDS may alternatively query, on the plurality of physical servers in another manner, the M virtual machines that are deployed as SNs. For example, in a possible implementation, when receiving, for the first time, the identifiers of the virtual machines sent by the virtual machine manager, the MDS stores the received identifiers of the virtual machines, and then the MDS may query, in local storage, the virtual machines that are on the plurality of physical servers and that are deployed as SNs.

Step 303: The MDS receives the identifiers of the M virtual machines sent by the virtual machine manager, and groups the M virtual machines.

The M virtual machines are virtual machines that are deployed as SNs. The M virtual machines may include both virtual machines deployed on a same physical server and virtual machines separately deployed on different physical servers. The distributed storage system may have different requirements when storing different data, for example, some data needs to be stored in SNs of virtual machines deployed on a same physical server. Therefore, to facilitate data storage of the distributed storage system, the MDS may group the M virtual machines. In addition, because the MDS does not need to obtain physical addresses of the plurality of physical servers or a virtual machine distribution status of each physical server, a position of each physical server and the virtual machine distribution status of each physical server are not disclosed. This improves stability and security of the physical server, and further improves stability and security of the virtualization environment established on the physical servers and the distributed storage system deployed in the virtualization environment.

The MDS may group the M virtual machines using at least one of the following two possible implementations.

In a first possible implementation, virtual machines in each anti-affinity group have anti-affinity with each other, and the virtual machines in each anti-affinity group are separately deployed on different servers. Therefore, when data is stored in SNs that are deployed in virtual machines of a same anti-affinity group, it can be ensured that when a physical server of a specific SN that stores the data is faulty, the data can be obtained from an SN of a virtual machine deployed on another physical server, and this can improve reliability of the stored data. Therefore, the MDS may group the M virtual machines into a plurality of anti-affinity groups, and record, in grouping information, a mapping relationship between the plurality of anti-affinity groups and the identifiers of the M virtual machines.

A quantity X of virtual machines included in each anti-affinity group is usually greater than or equal to a minimum quantity of data duplicates for data reliability storage, and X is less than M. X may be determined before the MDS groups the M virtual machines into the plurality of anti-affinity groups. For example, a possible implementation policy is that X is obtained from a numerical value that is input by a user and is received by the MDS.

It should be further noted that the minimum quantity of data duplicates for data reliability storage may be determined by the user based on actual data storage experience. For example, the minimum quantity of data duplicates may be 2 or 3.

For example, the MDS finds that identifiers of 12 virtual machines are VM1, VM2, VM3, VM4, VM5, VM6, VM7, VM8, VM9, VM10, VM11, and VM12, and a value of X is 3. The MDS groups the 12 virtual machines into four anti-affinity groups: an anti-affinity group 1 including VM1, VM5, and VM9, an anti-affinity group 2 including VM2, VM6, and VM10, an anti-affinity group 3 including VM3, VM7, and VM11, and an anti-affinity group 4 including VM4, VM8, and VM12; and records, in the grouping information, a mapping relationship between the four anti-affinity groups and the identifiers of the 12 virtual machines: the anti-affinity group 1 corresponds to VM1, VM5, and VM9, the anti-affinity group 2 corresponds to VM2, VM6, and VM10, the anti-affinity group 3 corresponds to VM3, VM7, and VM11, and the anti-affinity group 4 corresponds to VM4, VM8, and VM12.

In a second possible implementation, virtual machines in each affinity group have affinity with each other, and virtual machines in each affinity group may be deployed on a same server. Therefore, when data is stored in SNs in virtual machines of a same affinity group, the data can be fast stored in the SNs in the virtual machines of the same affinity group, or the data can be fast obtained from the SNs in the virtual machines of the same affinity group, so that data storage efficiency can be improved. Therefore, the MDS may group the M virtual machines into a plurality of affinity groups, and record, in the grouping information, a mapping relationship between the plurality of affinity groups and the identifiers of the M virtual machines.

A quantity Y of virtual machines included in each affinity group may be greater than or equal to a minimum quantity of data duplicates for data reliability storage, and Y is less than M. Y may be determined before the MDS groups the M virtual machines into the plurality of affinity groups. For example, a possible implementation policy is that Y is obtained from a numerical value that is input by a user and is received by the MDS.

For example, the MDS finds that identifiers of 12 virtual machines are VM1, VM2, VM3, VM4, VM5, VM6, VM7, VM8, VM9, VM10, VM11, and VM12, and a value of Y is 4. The MDS groups the identifiers of the 12 virtual machines into three anti-affinity groups: an affinity group 1 including VM1, VM2, VM3, and VM4, an affinity group 2 including VM5, VM6, VM7, and VM8, and an affinity group 3, including VM9, VM10, VM11, and VM12; and records, in the grouping information, a mapping relationship between the three affinity groups and the identifiers of the 12 virtual machines: the affinity group 1 corresponds to VM1, VM2, VM3, and VM4, the affinity group 2 corresponds to VM5, VM6, VM7, and VM8, and the affinity group 3 corresponds to VM9, VM10, VM11, VM12.

It should be noted that, in order to consider both data storage reliability and efficiency, the MDS may alternatively group the M virtual machines into a plurality of affinity groups based on affinity and a plurality of anti-affinity groups based on anti-affinity, and record, in the grouping information, a mapping relationship between the plurality of affinity groups and the identifiers of the M virtual machines and a mapping relationship between the plurality of anti-affinity groups and the identifiers of the M virtual machines.

For example, the MDS finds that identifiers of 12 virtual machines are VM1, VM2, VM3, VM4, VM5, VM6, VM7, VM8, VM9, VM10, VM11, and VM12, a value of X is 3, and a value of Y is 4. The MDS groups the identifiers of the 12 virtual machines into three anti-affinity groups and four affinity groups. The anti-affinity groups include: an anti-affinity group 1 including VM1, VM5, and VM9, an anti-affinity group 2 including VM2, VM6, and VM10, an anti-affinity group 3 including VM3, VM7, and VM11, and an anti-affinity group 4 including VM4, VM8, and VM12; and the affinity groups include: an affinity group 1 including VM1, VM2, VM3, and VM4, an affinity group 2 including VM5, VM6, VM7, and VM8, and an affinity group 3 including VM9, VM10, VM11, and VM12. The MDS records, in the grouping information, a mapping relationship between the four anti-affinity groups and the identifiers of the 12 virtual machines: the anti-affinity group 1 corresponds to VM1, VM5, and VM9, the anti-affinity group 2 corresponds to VM2, VM6, and VM10, the anti-affinity group 3 corresponds to VM3, VM7, and VM11, and the anti-affinity group 4 corresponds to VM4, VM8, and VM12, and records, in the grouping information, a mapping relationship between the three affinity groups and the identifiers of the 12 virtual machines: the affinity group 1 corresponds to VM1, VM2, VM3, and VM4, the affinity group 2 corresponds to VM5, VM6, VM7, and VM8, and the affinity group 3 corresponds to VM9, VM10, VM11, and VM12.

Step 304: The MDS sends the grouping information to the virtual machine manager.

After the MDS groups the identifiers of the M virtual machines, an actual distribution status of the M virtual machines on the plurality of physical servers may be inconsistent with the grouping information. Therefore, to improve reliability of the distributed storage system, the MDS may send the grouping information to the virtual machine manager, so that the virtual machine manager deploys the M virtual machines based on the grouping information. A deployment implementation may be creating a virtual machine or migrating an existing virtual machine based on the grouping information.

It should be noted that the virtual machine manager may include a configuration interface, and receive the grouping information through the configuration interface.

In addition, to ensure that the distributed storage system can store data based on the grouped virtual machines, the MDS may also store the grouping information.

Step 305: The virtual machine manager receives the grouping information sent by the MDS, and deploys the M virtual machines based on the grouping information.

The actual distribution status of the M virtual machines on the plurality of physical servers may be inconsistent with the grouping information. Therefore, to improve reliability of the distributed storage system, the virtual machine manager may deploy the M virtual machines based on the grouping information. In addition, the virtual machine manager neither needs to notify the MDS when deploying the M virtual machines, nor needs to notify the MDS of the physical addresses of the plurality of physical servers and the virtual machine distribution status of each physical server after completing deployment. Therefore, in this embodiment of the present application, the virtual machine manager can perform perception-free deployment of the M virtual machines on the plurality of physical servers.

It should be noted that, when deploying the M virtual machines based on the grouping information, the virtual machine manager may migrate at least one created virtual machine of the M virtual machines based on the grouping information, or may create a virtual machine on a physical server based on the grouping information, to implement deployment of the M virtual machines.

The virtual machine manager may deploy the M virtual machines based on the grouping information using at least one of the following two possible implementations.

In a first possible implementation, when the mapping relationship between the plurality of anti-affinity groups and the identifiers of the M virtual machines is recorded in the grouping information, the virtual machine manager determines virtual machines of a same anti-affinity group, and separately migrates the virtual machines of the same anti-affinity group to different physical servers of the plurality of physical servers.

Figure 3B:
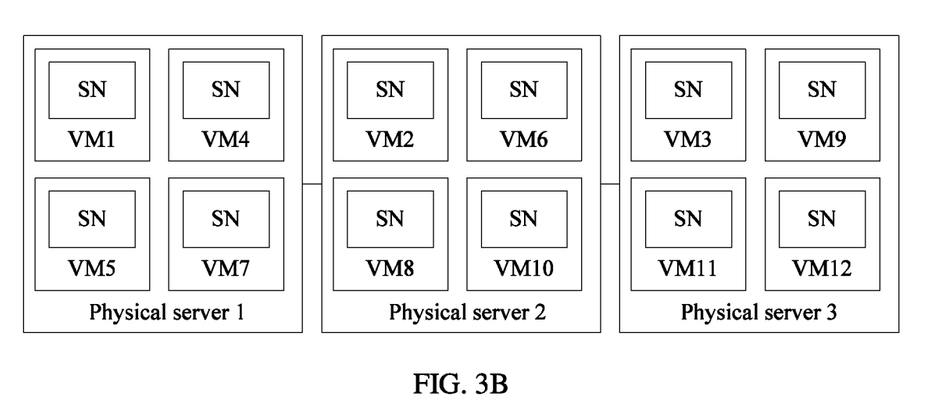
FIG. 3B is a schematic diagram of another physical server according to an embodiment of the present application.
Figure 3C:
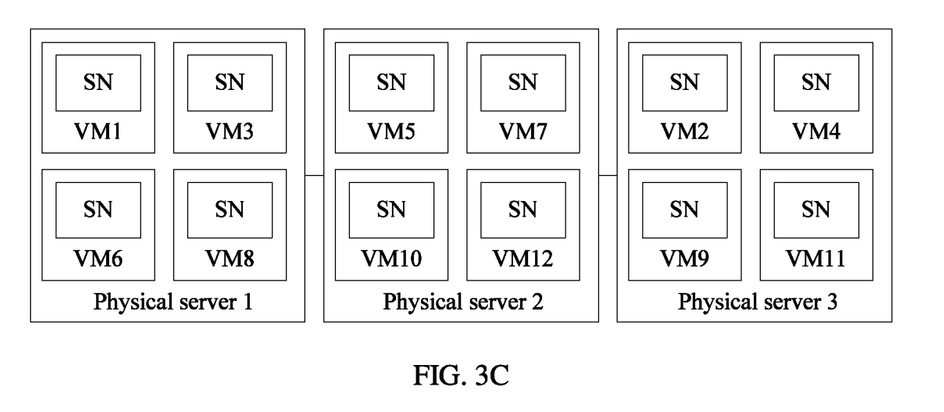
FIG. 3C is a schematic diagram of still another physical server according to an embodiment of the present application.

For example, before the virtual machine manager migrates the virtual machines, distribution of the virtual machines on the plurality of physical servers is shown in FIG. 3B, where virtual machines included in a physical server 1 are VM1, VM4, VM5, and VM7. Virtual machines included in a physical server 2 are VM2, VM6, VM8, and VM10. Virtual machines included in a physical server 3 are VM3, VM9, VM11, and VM12. The grouping information received by the virtual machine manager is: The anti-affinity group 1 corresponds to VM1, VM5, and VM9, the anti-affinity group 2 corresponds to VM2, VM6, and VM10, the anti-affinity group 3 corresponds to VM3, VM7, and VM11, and the anti-affinity group 4 corresponds to VM4, VM8, and VM12. Therefore, the virtual machine manager migrates the virtual machines on the three physical servers, and after migration, distribution of the virtual machines on the three physical servers is shown in FIG. 3C. Virtual machines included in the physical server 1 are VM1, VM3, VM6, and VM8. Virtual machines included in the physical server 2 are VM5, VM7, VM10, and VM12. Virtual machines included in the physical server 3 are VM2, VM4, VM9, and VM11.

In a second possible implementation, when the mapping relationship between the plurality of affinity groups and the identifiers of the M virtual machines is recorded in the grouping information, the virtual machine manager determines virtual machines of a same affinity group, and migrates the virtual machines of the same affinity group to a same physical server of the plurality of physical servers.

Figure 3D:
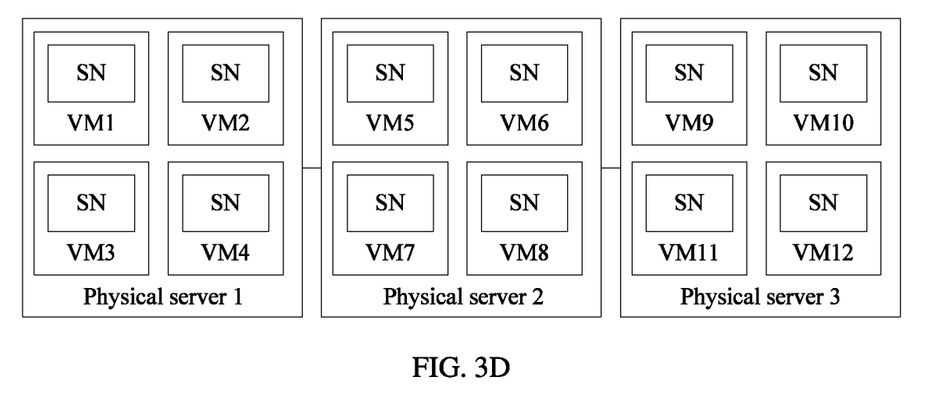
FIG. 3D is a schematic diagram of still another physical server according to an embodiment of the present application.

For example, before the virtual machine manager migrates the virtual machines, distribution of the virtual machines on the plurality of physical servers is shown in FIG. 3B, where virtual machines included in a physical server 1 are VM1, VM4, VM5, and VM7. Virtual machines included in a physical server 2 are VM2, VM6, VM8, and VM10. Virtual machines included in a physical server 3 are VM3, VM9, VM11, and VM12. The grouping information received by the virtual machine manager is: The affinity group 1 corresponds to VM1, VM2, VM3, and VM4, the affinity group 2 corresponds to VM5, VM6, VM7, and VM8, and the affinity group 3 corresponds to VM9, VM10, VM11, and VM12. Therefore, the virtual machine manager migrates the virtual machines on the three physical servers, and after migration, distribution of the virtual machines on the three physical servers is shown in FIG. 3D. Virtual machines included in the physical server 1 are VM1, VM2, VM3, and VM4. Virtual machines included in the physical server 2 are VM5, VM6, VM7, and VM8. Virtual machines included in the physical server 3 are VM9, VM10, VM11, and VM12.

In addition, when the mapping relationship between the plurality of anti-affinity groups and the identifiers of the M virtual machines and the mapping relationship between the plurality of affinity groups and the identifiers of the M virtual machines are recorded in the grouping information, the virtual machine manager not only needs to separately migrate virtual machines of a same anti-affinity group to different physical servers of the plurality of physical servers, but also needs to migrate virtual machines of a same affinity group to a same physical server of the plurality of physical servers.

In steps 301 to 305, the MDS groups the M virtual machines on the plurality of physical servers and stores the grouping information, and the virtual machine manager deploys the M virtual machines, to ensure that a distribution status of the M virtual machines on the plurality of physical servers is consistent with the grouping information stored by the MDS. Therefore, in the following steps, data may be stored based on the stored grouping information.

Step 306: The MDS receives a data storage request of a client, and determines that a quantity of storage copies of data specified in the data storage request is N, where N is a positive integer greater than or equal to 1.

To implement data storage in the distributed storage system, the MDS may receive the data storage request sent by the client, and determine the quantity of storage copies of the data specified in the data storage request.

The data storage request may include a block identifier of the specified data or a file identifier of a file to which the specified data belongs.

It should be noted that the specified data is to-be-stored data, and may be a data block.

It should be further noted that the block identifier is used to uniquely identify a data block, and the block identifier may be an identification (ID) identifier of the data block. Certainly, in an actual realization, the block identifier may alternatively be another identifier that can uniquely identify the data block.

It should be further noted that the file identifier is used to uniquely identify the file, and the file identifier may be a file name of the file or the like. Certainly, in an actual realization, the file identifier may alternatively be another identifier that can uniquely identify the file.

Further, to ensure flexibility of storing the specified data, the data storage request may carry the quantity N of storage copies of the specified data. In other words, N may be determined by the client.

N is a positive integer greater than or equal to 1. N may be determined before the client sends the data storage request to the MDS. For example, in a possible implementation, the client receives a numerical value input by a user, and determines the received numerical value as N. Certainly, in an actual application, the client may alternatively determine a value of N in another manner.

In another possible implementation, to improve data storage reliability, the data storage request may not carry N. In other words, N may be determined by the MDS. A possible policy is that N may be determined by a relevant person skilled in the art when deploying the MDS.

Step 307: The MDS determines identifiers of N virtual machines based on the grouping information, and sends response information of the data storage request to the client, where the response information includes the identifiers of the N virtual machines.

To facilitate data storage of the client, the MDS may determine the N virtual machines from the M virtual machines based on the grouping information, and send the response information to the client, where the response information is used to instruct the client to store, in the N virtual machines, N copies of the data specified in the data storage request. Specifically, each of the N virtual machines stores one copy of the data specified in the data storage request, therefore allocation to the client, virtual machines in which SNs used to store the specified data are realized.

It should be noted that the N virtual machines corresponding to the identifiers of the N virtual machines belong to at least one anti-affinity group, and the N virtual machines are virtual machines of the M virtual machines. To be specific, the M virtual machines include the N virtual machines.

The MDS may determine the identifiers of the N virtual machines based on the grouping information in the following two possible implementations.

In a first possible implementation, to improve data storage reliability and security, the MDS may preferentially allocate N virtual machines with anti-affinity to the client. When X is greater than or equal to N, the MDS determines the identifiers of the N virtual machines from one of the plurality of anti-affinity groups, or when X is less than N, the MDS determines the identifiers of the N virtual machines from at least two anti-affinity groups.

The MDS may determine X virtual machines from any one of the at least two anti-affinity groups, and determine N-X virtual machines from another of the at least two anti-affinity groups, to obtain the N virtual machines.

Further, the MDS determines the identifiers of the N virtual machines from the at least two anti-affinity groups based on affinity.

The MDS may determine the X virtual machines from any one of the at least two anti-affinity groups, and the MDS determines, from another of the at least two anti-affinity groups based on affinity, the N-X virtual machines that are in a same affinity group as at least one of the X virtual machines, to obtain the N virtual machines.

It should be noted that, as may be known from the foregoing description, that the mapping relationship between the plurality of affinity groups and the identifiers of the M virtual machines may be recorded in the grouping information. Therefore, the MDS may select, based on affinity, the N-X virtual machines from an affinity group to which at least one of the X virtual machines belongs.

For example, a data block identifier being block 1 and a quantity N of storage copies being 2 are carried in the data storage request received by the MDS. Because X is 3, namely, X is greater than or equal to N, the MDS determines two virtual machines from the anti-affinity group 1 based on the grouping information, where identifiers of the two virtual machines are VM1 and VM5.

For example, a data block identifier being block 2 and a quantity N of storage copies being 4 are carried in the data storage request received by the MDS. Because X is 3, namely, X is less than N, the MDS determines three virtual machines from the anti-affinity group 1 based on the grouping information, where identifiers of the three virtual machines are VM1, VM5, and VM9, and determines one virtual machine from the anti-affinity group 2 based on the affinity group 1 to which VM1 belongs, where an identifier of the virtual machine is VM2, and VM2 belongs to the affinity group 1. Therefore, four virtual machines are obtained.

In a second possible implementation, to improve data storage efficiency, the MDS may preferentially allocate N virtual machines with affinity to the client. If Y is greater than or equal to N, the MDS determines the identifiers of the N virtual machines from one of the plurality of affinity groups, or if Y is less than N, the MDS determines the identifiers of the N virtual machines from at least two affinity groups.

It should be noted that the step that the MDS determines the identifiers of the N virtual machines from the at least two affinity groups is similar to the step in the first possible implementation that the MDS determines the identifiers of the N virtual machines from the at least two anti-affinity groups, and details are not further described in this embodiment of the present application.

Further, to facilitate management of the specified data after the data is stored, after the MDS determines the identifiers of the N virtual machines based on the grouping information, the MDS may further store a correspondence between the block identifier of the specified data and the identifiers of the N virtual machines and a correspondence between the block identifier of the specified data and the file identifier of the file to which the specified data belongs.

Step 308: When receiving the identifiers of the N virtual machines, the client stores the specified data in the N virtual machines.

The identifiers of the N virtual machines are identifiers of the virtual machines that are allocated for the specified data by the MDS and that are deployed as SNs. Therefore, the client may store the specified data in the N virtual machines.

In addition, after the specified data is stored, the distributed storage system may manage the specified data, for example, reading, dumping, and deletion. This is not specifically limited in this embodiment of the present application.

In this embodiment of the present application, the MDS in the distributed storage system can first receive the data storage request of the client, and determine, from the at least one anti-affinity group based on the stored grouping information, the identifiers of the N virtual machines that meet a data storage requirement, to ensure that the client can store data in the virtual machines that correspond to the identifiers of the N virtual machines and that are deployed as SNs. The mapping relationship between the plurality of anti-affinity groups and the identifiers of the M virtual machines is recorded in the grouping information, with no need to obtain physical addresses of the plurality of physical servers or a virtual machine distribution status of each physical server. Therefore, a position of each physical server and the virtual machine distribution status of each physical server are not disclosed. This improves stability and security of the physical server, and further improves stability and security of the virtualization environment and the distributed storage system deployed in the virtualization environment. In addition, when determining the identifiers of the N virtual machines, the MDS can compare N with the quantity X of virtual machines included in the anti-affinity group, and determine the identifiers of the N virtual machines by using a different policy depending on a comparison result. This ensures reliability and stability of the storage system, and also improves flexibility of the distributed storage system. Finally, the MDS can group the identifiers of the N virtual machines that are sent by the virtual machine manager, and send the grouping information to the virtual machine manager, to ensure that the virtual machine manager can deploy the N virtual machines based on the grouping information. This ensures that the actual distribution status of the N virtual machines on the plurality of physical servers is consistent with the grouping information, and further improves stability and reliability of the distributed storage system.

Figure 4A:
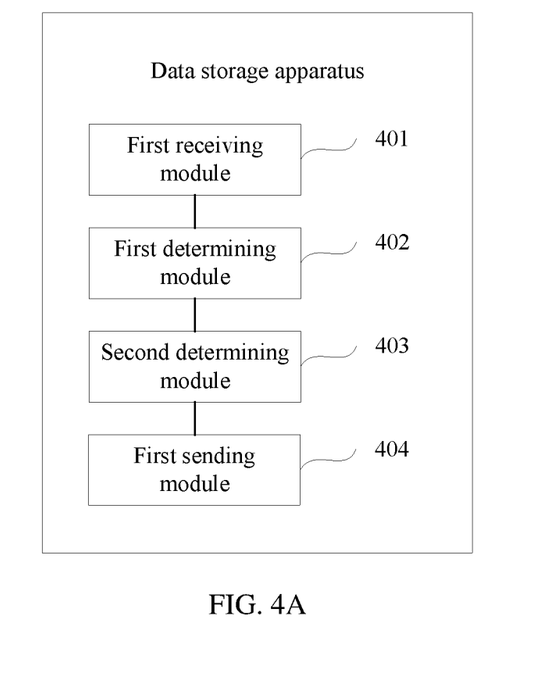
FIG. 4A is a schematic structural diagram of a data storage apparatus according to an embodiment of the present application.

FIG. 4A is a schematic diagram of a data storage apparatus according to an embodiment of the present application. At least M virtual machines are deployed on a plurality of physical servers, the M virtual machines are respectively deployed as M SNs in a distributed storage system, and M is a positive integer greater than or equal to 2. Referring to FIG. 4A, the apparatus includes: a first receiving module 401, a first determining module 402, a second determining module 403, and a first sending module 404.

The first receiving module 401 is configured to perform an operation in step 306 that an MDS in the distributed storage system receives a data storage request of a client.

The first determining module 402 is configured to perform an operation in step 306 that the MDS determines that a quantity of storage copies of data specified in the data storage request is N.

The second determining module 403 is configured to perform an operation in step 307 that the MDS determines identifiers of N virtual machines based on grouping information.

The first sending module 404 is configured to perform an operation in step 307 that the MDS sends response information of the data storage request to the client.

Optionally, the second determining module 403 includes: a first determining sub-module, configured to perform an operation in step 307 that the MDS determines the identifiers of the N virtual machines from one of a plurality of anti-affinity groups if a quantity of identifiers of the virtual machines included in the anti-affinity group is greater than or equal to N; and a second determining sub-module, configured to perform an operation in step 307 that the MDS determines the identifiers of the N virtual machines from at least two anti-affinity groups if a quantity of identifiers of virtual machines included in the anti-affinity group is less than N.

Figure 4B:
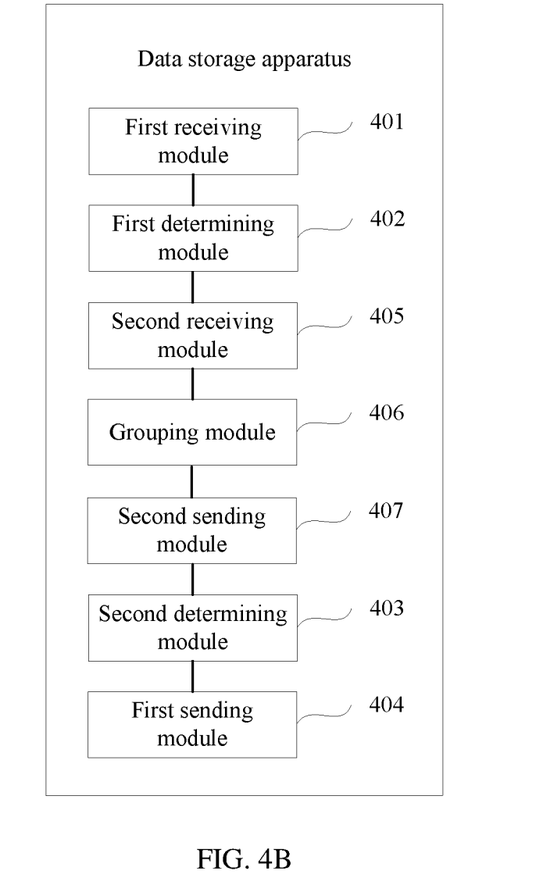
FIG. 4B is a schematic structural diagram of another data storage apparatus according to an embodiment of the present application.

Optionally, the second determining sub-module is further configured to: determine, for the MDS, the identifiers of the N virtual machines from the at least two anti-affinity groups based on affinity. Optionally, referring to FIG. 4B, the apparatus further includes: a second receiving module 405, configured to perform an operation in step 303 that the MDS receives the identifiers of the M virtual machines sent by the virtual machine manager; a grouping module 406, configured to perform an operation in step 303 that the MDS groups the M virtual machines into the plurality of anti-affinity groups, and records, in the grouping information, a mapping relationship between the plurality of anti-affinity groups and the identifiers of the M virtual machines; and a second sending module 407, configured to perform an operation in step 304.

Optionally, the M virtual machines belong to a plurality of affinity groups, virtual machines in each affinity group have affinity with each other, and a mapping relationship between the plurality of affinity groups and the identifiers of the M virtual machines is recorded in the grouping information.

In this embodiment of the present application, the MDS in the distributed storage system can receive the data storage request of the client, and determine, from the at least one anti-affinity group based on the stored grouping information, the identifiers of the N virtual machines that meet a data storage requirement, to ensure that the client can store data in the virtual machines that correspond to the identifiers of the N virtual machines and that are deployed as SNs. The mapping relationship between the plurality of anti-affinity groups and the identifiers of the M virtual machines is recorded in the grouping information, with no need to obtain physical addresses of the plurality of physical servers or a virtual machine distribution status of each physical server. Therefore, a position of each physical server and the virtual machine distribution status of each physical server are not disclosed. This improves stability and security of the physical server, and further improves stability and security of a virtualization environment and the distributed storage system deployed in the virtualization environment.

Figure 5:
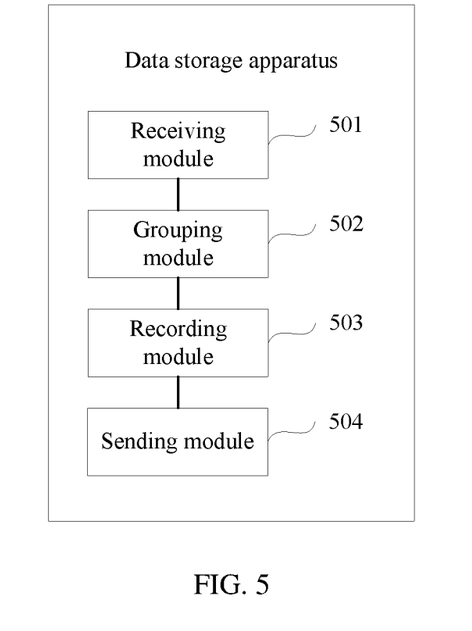
FIG. 5 is a schematic structural diagram of still another data storage apparatus according to an embodiment of the present application.

FIG. 5 is a schematic diagram of a data storage apparatus according to an embodiment of the present application. At least M virtual machines are deployed on a plurality of physical servers, the M virtual machines are respectively deployed as M data nodes (SNs) in a distributed storage system, and M is a positive integer greater than or equal to 2. Referring to FIG. 5, the apparatus includes: a receiving module 501, a grouping module 502, a recording module 503, and a sending module 504.

The receiving module 501 is configured to perform an operation, for example as described above in step 303 of FIG. 3A. An MDS in the distributed storage system receives identifiers of the M virtual machines sent by a virtual machine manager.

The grouping module 502 is configured to perform an operation, for example as described above in step 303 of FIG. 3A. The MDS groups the M virtual machines into a plurality of anti-affinity groups.

The recording module 503 is configured to perform an operation, for example as described above in step 303 of FIG. 3A. The MDS records, in grouping information, a mapping relationship between the plurality of anti-affinity groups and the identifiers of the M virtual machines.

The sending module 504 is configured to perform an operation, for example as described above in step 304 of FIG. 3A.

In this embodiment of the present application, the MDS can first group the identifiers of the N virtual machines that are sent by the virtual machine manager, and send the grouping information to the virtual machine manager, to ensure that the virtual machine manager can deploy the N virtual machines based on the grouping information. This ensures that an actual distribution status of the N virtual machines on the plurality of physical servers is consistent with the grouping information, and improves stability and reliability of the distributed storage system. In addition, because physical addresses of the plurality of physical servers or a virtual machine distribution status of each physical server does not need to be obtained, a position of each physical server and the virtual machine distribution status of each physical server are not disclosed. This improves stability and security of the physical server, and further improves stability and security of a virtualization environment and the distributed storage system deployed in the virtualization environment.

Figure 6:
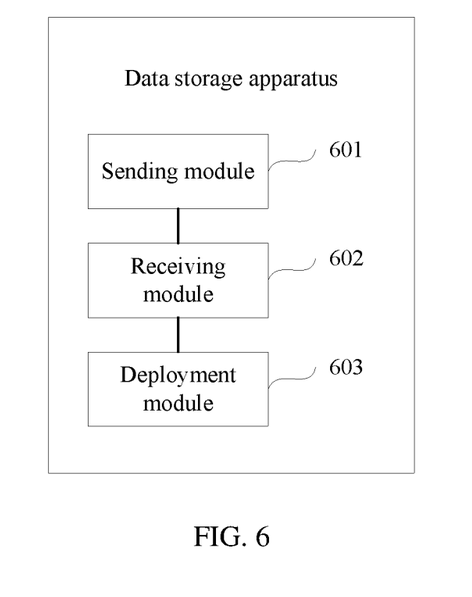
FIG. 6 is a schematic structural diagram of still another data storage apparatus according to an embodiment of the present application.

FIG. 6 is a schematic diagram of a data storage apparatus according to an embodiment of the present application. At least M virtual machines are deployed on a plurality of physical servers, the M virtual machines are respectively deployed as M data nodes (SNs) in a distributed storage system, and M is a positive integer greater than or equal to 2. Referring to FIG. 6, the apparatus includes: a sending module 601, a receiving module 602, and a deployment module 603.

The sending module 601 is configured to perform an operation, for example as described above in step 302 of FIG. 3A. A virtual machine manager sends identifiers of the M virtual machines to a metadata node (MDS) in the distributed storage system.

The receiving module 602 is configured to perform an operation, for example as described above in step 305 of FIG. 3A. The virtual machine manager receives grouping information sent by the MDS.

The deployment module 603 is configured to perform an operation, for example as described above in step 305 of FIG. 3A. The virtual machine manager deploys the M virtual machines based on the grouping information.

Optionally, the M virtual machines belong to a plurality of affinity groups, virtual machines in each affinity group have affinity with each other, and a mapping relationship between the plurality of affinity groups and the identifiers of the M virtual machines is recorded in the grouping information.

In this embodiment of the present application, the virtual machine manager may send, to the MDS, the identifiers of the M virtual machines that are deployed as SNs, and deploy the M virtual machines based on the received grouping information that is obtained by grouping the M virtual machines. This ensures that an actual distribution status of the N virtual machines on the plurality of physical servers is consistent with the grouping information, and improves stability and reliability of the distributed storage system. In addition, because physical addresses of the plurality of physical servers or a virtual machine distribution status of each physical server does not need to be sent to the MDS, a position of each physical server and the virtual machine distribution status of each physical server are not disclosed. This improves stability and security of the physical server, and further improves stability and security of a virtualization environment and the distributed storage system deployed in the virtualization environment.

It should be noted that data storage of the data storage apparatuses provided in the foregoing embodiments is described only by using division of the foregoing functional modules as an example. In an actual application, the foregoing functions may be allocated to different functional modules for implementation depending on a requirement. That is, an internal structure of the apparatus is divided into different functional modules to implement all or some of the functions described above. In addition, the data storage apparatuses provided in the foregoing embodiments pertain to a same concept as the embodiments of the data storage methods. For a specific implementation process of the data storage apparatuses, refer to the method embodiments, and details are not described herein again.

A person of ordinary skill in the art may understand that all or some of the steps of the embodiments may be implemented by hardware or a program instructing related hardware. The program may be stored in a computer-readable storage medium. The aforementioned storage medium may include: a read-only memory, a magnetic disk, or an optical disc.

The foregoing descriptions are merely example embodiments of the present application, but are not intended to limit the present application. Any modification, equivalent replacement, and improvement made without departing from the spirit and principle of the present application shall fall within the protection scope of the present application.

What is claimed is:

1. A method, comprising:
receiving, by a metadata node (MDS) in a distributed storage system, a data storage request of a client, wherein the distributed storage system comprises M data nodes, the M data nodes are deployed on M virtual machines, and the M is a positive integer greater than or equal to 2;
determining, by the MDS, that a quantity of storage copies of data specified in the data storage request is N, wherein the N is a positive integer greater than or equal to 1;
determining, by the MDS, identifiers of N virtual machines of the M virtual machines, wherein the identifiers of the N virtual machines are determined based on grouping information, a mapping relationship between a plurality of anti-affinity groups and identifiers of the M virtual machines is recorded in the grouping information, wherein the N virtual machines belong to at least one anti-affinity group of the plurality of anti-affinity groups, and wherein virtual machines in each anti-affinity group of the plurality of anti-affinity groups have anti-affinity with each other; and
sending, by the MDS, response information of the data storage request to the client, wherein the response information comprises the identifiers of the N virtual machines, and the response information instructs the client to store, in the N virtual machines, N copies of the data specified in the data storage request.

2. The method according to claim 1, wherein the determining the identifiers of the N virtual machines, wherein the identifiers of the N virtual machines are determined based on the grouping information, comprises:
when a quantity of the virtual machines in the each anti-affinity group of the plurality of anti-affinity groups is greater than or equal to the N, determining, by the MDS, the identifiers of the N virtual machines from one of the plurality of anti-affinity groups; or
when the quantity of the virtual machines in the each anti-affinity group of the plurality of anti-affinity groups is less than the N, determining, by the MDS, the identifiers of the N virtual machines from at least two anti-affinity groups of the plurality of anti-affinity groups.

3. The method according to claim 2, wherein the determining, by the MDS, the identifiers of the N virtual machines from the at least two anti-affinity groups of the plurality of anti-affinity groups comprises:
determining, by the MDS, the identifiers of the N virtual machines from the at least two anti-affinity groups based on affinity.

4. The method according to claim 3, wherein the M virtual machines belong to a plurality of affinity groups, virtual machines in each affinity group of the plurality of affinity groups have affinity with each other, and a mapping relationship between the plurality of affinity groups and the identifiers of the M virtual machines is recorded in the grouping information.

5. The method according to claim 4, wherein the virtual machines in the each affinity group are deployed on a same physical server.

6. The method according to claim 1, further comprising:
receiving, by the MDS, the identifiers of the M virtual machines sent by a virtual machine manager;
grouping, by the MDS, the M virtual machines into the plurality of anti-affinity groups, and recording, in the grouping information, the mapping relationship between the plurality of anti-affinity groups and the identifiers of the M virtual machines; and
sending, by the MDS, the grouping information to the virtual machine manager.

7. The method according to claim 1, wherein any two of the virtual machines in the each anti-affinity group are deployed on different physical servers.

8. A method, comprising:
sending, by a virtual machine manager, identifiers of M virtual machines to a metadata node (MDS) in a distributed storage system, wherein the distributed storage system comprises M data nodes, the M data nodes are deployed on the M virtual machines, and the M is a positive integer greater than or equal to 2;
receiving, by the virtual machine manager, grouping information sent by the MDS, wherein a mapping relationship between a plurality of anti-affinity groups and the identifiers of the M virtual machines is recorded in the grouping information, and virtual machines in each anti-affinity group of the plurality of anti-affinity groups have anti-affinity with each other; and
deploying, by the virtual machine manager, the M virtual machines based on a comparison between the grouping information and an actual distribution status of the M virtual machines, wherein, after the deploying, any two of the virtual machines in the each anti-affinity group of the plurality of anti-affinity groups are deployed on different physical servers, the deploying comprising:
determining, by the virtual machine manager, that the actual distribution status of the M virtual machines is inconsistent with the grouping information, wherein a first virtual machine and a second virtual machine of a first anti-affinity group of the plurality of anti-affinity groups are on a first physical server of the different physical servers; and
based on the actual distribution status and the grouping information, migrating, by the virtual machine manager, the second virtual machine from the first physical server to a second physical server of the different physical servers.

9. The method according to claim 8, wherein the M virtual machines belong to a plurality of affinity groups, virtual machines in each affinity group of the plurality of affinity groups have affinity with each other, and a mapping relationship between the plurality of affinity groups and the identifiers of the M virtual machines is recorded in the grouping information.

10. The method according to claim 9, wherein the virtual machines in the each affinity group are deployed on a same physical server.

11. A physical server, comprising:
a non-transitory memory storing instructions;
at least one processor, wherein the at least one processor is configured to execute the instructions in the non-transitory memory to:
  receive, for a metadata node (MDS) in a distributed storage system, a data storage request of a client, wherein the distributed storage system comprises M data nodes, the M data nodes are deployed on M virtual machines, and the M is a positive integer greater than or equal to 2;
  determine, for the MDS, that a quantity of storage copies of data specified in the data storage request is N, wherein N is a positive integer greater than or equal to 1;
  determine, for the MDS, identifiers of N virtual machines of the M virtual machines,
wherein the identifiers of the N virtual machines are determined based on grouping information, wherein a mapping relationship between a plurality of anti-affinity groups and identifiers of the M virtual machines is recorded in the grouping information, the N virtual machines corresponding to the identifiers of the N virtual machines belong to at least one anti-affinity group of the plurality of anti-affinity groups, and wherein virtual machines in each anti-affinity group of the plurality of anti-affinity groups have anti-affinity with each other; and
send, for the MDS, response information of the data storage request to the client, wherein the response information comprises the identifiers of the N virtual machines, and the response information instructs the client to store, in the N virtual machines, N copies of the data specified in the data storage request.

12. The physical server according to claim 11, wherein the at least one processor is configured to execute the instructions to:
  determine, for the MDS, the identifiers of the N virtual machines from one of the plurality of anti-affinity groups when a quantity of the virtual machines in the each anti-affinity group of the plurality of anti-affinity groups is greater than or equal to the N; or
  determine, for the MDS, the identifiers of the N virtual machines from at least two anti-affinity groups when the quantity of the virtual machines in the each anti-affinity group of the plurality of anti-affinity groups is less than N.

13. The physical server according to claim 12, wherein the at least one processor is configured to execute the instructions to:
  determine, for the MDS, the identifiers of the N virtual machines from the at least two anti-affinity groups based on affinity.

14. The physical server according to claim 13, wherein the M virtual machines belong to a plurality of affinity groups, virtual machines in each affinity group of the plurality of affinity groups have affinity with each other, and a mapping relationship between the plurality of affinity groups and the identifiers of the M virtual machines is recorded in the grouping information.

15. The physical server according to claim 14, wherein the virtual machines in the each affinity group are deployed on a same physical server.

16. The physical server according to claim 11, wherein the at least one processor is configured to execute the instructions to:
  receive, for the MDS, the identifiers of the M virtual machines sent by a virtual machine manager;
  group, for the MDS, the M virtual machines into the plurality of anti-affinity groups;
  record, for the MDS, in the grouping information, the mapping relationship between the plurality of anti-affinity groups and the identifiers of the M virtual machines; and
  send, for the MDS, the grouping information to the virtual machine manager, causing the virtual machine manager to deploy the M virtual machines based on the grouping information.

17. The physical server according to claim 11, wherein any two of the virtual machines in the each anti-affinity group are deployed on different physical servers.

18. A physical server, comprising:
a non-transitory memory storing instructions;
at least one processor, wherein the at least one processor is configured to execute the instructions to:
  send, for a virtual machine manager, identifiers of M virtual machines to a metadata node (MDS) in a distributed storage system, wherein the distributed storage system comprises M data nodes, the M are deployed on the M virtual machines, and the M is a positive integer greater than or equal to 2;
  receive, for the virtual machine manager, grouping information sent by the MDS, wherein a mapping relationship between a plurality of anti-affinity groups and the identifiers of the M virtual machines is recorded in the grouping information, virtual machines in each anti-affinity group of the plurality of anti-affinity groups have anti-affinity with each other, the grouping information is used by the MDS to determine identifiers of N virtual machines from at least one anti-affinity group of the plurality of anti-affinity groups when a client requests to store data, the N virtual machines are configured to store N copies of client-specified to-be-stored data, and the N is a positive integer greater than or equal to 1; and
  deploy, for the virtual machine manager, the M virtual machines based on the grouping information.

19. The physical server according to claim 18, wherein the M virtual machines belong to a plurality of affinity groups, virtual machines in each affinity group of the plurality of affinity groups have affinity with each other, and a mapping relationship between the plurality of affinity groups and the identifiers of the M virtual machines is recorded in the grouping information.

* * * * *